(12) United States Patent
Xiang et al.

(10) Patent No.: US 11,423,676 B2
(45) Date of Patent: Aug. 23, 2022

(54) METHOD AND APPARATUS FOR DETECTING ON-DUTY STATE OF DRIVER, DEVICE, AND COMPUTER STORAGE MEDIUM

(71) Applicant: SHENZHEN SENSETIME TECHNOLOGY CO., LTD., Shenzhen (CN)

(72) Inventors: Jie Xiang, Shenzhen (CN); Shaopeng Yin, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/220,027

(22) Filed: Apr. 1, 2021

(65) Prior Publication Data

US 2021/0216799 A1 Jul. 15, 2021

Related U.S. Application Data

(63) Continuation of application No. PCT/CN2019/122211, filed on Nov. 29, 2019.

(30) Foreign Application Priority Data

Jun. 28, 2019 (CN) .......................... 201910580618.2

(51) Int. Cl.
*G08B 23/00* (2006.01)
*G06V 20/59* (2022.01)
(Continued)

(52) U.S. Cl.
CPC .......... *G06V 20/597* (2022.01); *B60W 40/08* (2013.01); *B60W 50/14* (2013.01); *G06V 10/141* (2022.01);
(Continued)

(58) Field of Classification Search
CPC .......... G06K 9/00845; G06K 9/00281; G06K 9/00288; G06K 9/2027; H04W 4/44;
(Continued)

(56) References Cited

U.S. PATENT DOCUMENTS

| 8,874,301 B1* | 10/2014 | Rao ...................... G05D 1/0061 |
| | | 340/576 |
| 2006/0215884 A1* | 9/2006 | Ota ........................ B60R 25/305 |
| | | 382/118 |

(Continued)

FOREIGN PATENT DOCUMENTS

| CN | 106372856 A | 2/2017 |
| CN | 107766835 A | 3/2018 |

(Continued)

OTHER PUBLICATIONS

International Search Report in the international application No. PCT/CN2019/122211, dated Mar. 27, 2020, 2 pgs.
(Continued)

*Primary Examiner* — Zhen Y Wu
(74) *Attorney, Agent, or Firm* — Cooper Legal Group, LLC (57) ABSTRACT

A method and apparatus for detecting an on-duty state of a driver, a device, and a computer storage medium are provided. The method includes: determining that a vehicle-mounted image acquisition device is not blocked; extracting a face image from an image acquired by the vehicle-mounted image acquisition device when a vehicle is in a starting state, where the vehicle-mounted image acquisition device is mounted on the vehicle and is at least configured to acquire an image of a driving position region of the vehicle; and in response to the case that no face image is extracted from the acquired image, determining that the driver is off duty.

15 Claims, 1 Drawing Sheet

(51) Int. Cl.
*H04W 4/44* (2018.01)
*B60W 40/08* (2012.01)
*B60W 50/14* (2020.01)
*H04N 7/18* (2006.01)
*G06V 10/141* (2022.01)
*G06V 40/16* (2022.01)

(52) U.S. Cl.
CPC .......... *G06V 40/171* (2022.01); *G06V 40/172* (2022.01); *H04N 7/183* (2013.01); *H04W 4/44* (2018.02); *B60W 2540/221* (2020.02)

(58) Field of Classification Search
CPC ................ B60W 40/08; B60W 50/14; B60W 2540/221; H04N 7/183
USPC ......................................................... 340/576
See application file for complete search history.

(56) References Cited

U.S. PATENT DOCUMENTS

| | | | | |
|---|---|---|---|---|
| 2008/0252412 | A1* | 10/2008 | Larsson | B60R 25/252 340/5.2 |
| 2013/0300869 | A1* | 11/2013 | Lu | H04N 7/18 348/148 |
| 2015/0363655 | A1* | 12/2015 | Artan | G06V 20/59 382/103 |
| 2016/0171319 | A1* | 6/2016 | Nagai | G06V 40/19 382/103 |
| 2017/0036599 | A1* | 2/2017 | Siddiqui | H04N 5/23293 |
| 2018/0105178 | A1* | 4/2018 | Khafagy | B60W 30/18054 |
| 2018/0181135 | A1* | 6/2018 | Urano | G05D 1/0088 |
| 2018/0354440 | A1* | 12/2018 | Pouliquen | B60N 2/0244 |
| 2018/0370431 | A1* | 12/2018 | Wincek | G10L 25/78 |
| 2019/0039564 | A1* | 2/2019 | Nishikawa | B60R 25/257 |
| 2019/0325603 | A1* | 10/2019 | Nogimori | G06V 10/426 |
| 2020/0231182 | A1* | 7/2020 | Oba | B60W 50/14 |
| 2021/0174065 | A1* | 6/2021 | Kumagai | B60Q 9/00 |
| 2021/0224555 | A1* | 7/2021 | Fent | G06V 20/56 |

FOREIGN PATENT DOCUMENTS

| | | |
|---|---|---|
| CN | 109409259 A | 3/2019 |
| CN | 109670436 A | 4/2019 |
| JP | 2004276782 A | 10/2004 |
| JP | 2005157648 A | 6/2005 |
| WO | 2018043100 A1 | 3/2018 |
| WO | 2018116373 A1 | 6/2018 |
| WO | 2018225176 A1 | 12/2018 |

OTHER PUBLICATIONS

"Research on Vehicle Anti-theft and Alarm System Using Facing Recognition", 2005, Zhixiong Liu and Guiming He, International Conference on Neural Networks and Brain, IEEE, ,https://sci-hub.se/10.1109/ICNNB.2005.1614771, pp. 925-929.

First Office Action of the Japanese application No. 2021-518896, dated May 24, 2022, 9 pgs.

* cited by examiner

METHOD AND APPARATUS FOR DETECTING ON-DUTY STATE OF DRIVER, DEVICE, AND COMPUTER STORAGE MEDIUM

CROSS-REFERENCE TO RELATED APPLICATIONS

This is a continuation application of International Patent Application No. PCT/CN2019/122211, filed on Nov. 29, 2019, which claims priority to Chinese Patent Application No. 201910580618.2, filed with the Chinese Patent Office on Jun. 28, 2019, and entitled "METHOD AND APPARATUS FOR DETECTING ON-DUTY STATE OF DRIVER, DEVICE, AND COMPUTER STORAGE MEDIUM". The contents of International Patent Application No. PCT/CN2019/122211 and Chinese Patent Application No. 201910580618.2 are incorporated herein by reference in their entireties.

BACKGROUND

In the related art, the functions of a driver monitoring system mainly include monitoring functions such as driver fatigue monitoring and dangerous driving behavior monitoring, can warn the driver according to a monitoring result, and can well improve the intelligent driving safety level and improve the driving safety of a vehicle.

SUMMARY

The present disclosure relates to the field of driving monitoring, and in particular, to a method and apparatus for detecting an on-duty state of a driver, an electronic device, and a computer storage medium.

Embodiments of the present disclosure are expected to provide technical solutions of detecting an on-duty state of a driver.

The embodiments of the present disclosure provide a method for detecting an on-duty state of a driver, including the following operations.

It is determined that a vehicle-mounted image acquisition device is not blocked.

A face image is extracted from an image acquired by the vehicle-mounted image acquisition device when a vehicle is in a starting state, where the vehicle-mounted image acquisition device is mounted on the vehicle and is at least configured to acquire an image of a driving position region of the vehicle.

In response to the case that no face image is extracted from the acquired image, it is determined that the driver is off duty.

The embodiments of the present disclosure further provide an apparatus for detecting an on-duty state of a driver, including a first processing module, an extracting module, and a second processing module.

The first processing module is configured to determine that a vehicle-mounted image acquisition device is not blocked.

The extracting module is configured to extract a face image from an image acquired by the vehicle-mounted image acquisition device when a vehicle is in a starting state, where the vehicle-mounted image acquisition device is mounted on the vehicle and is at least configured to acquire an image of the driving position region of the vehicle.

The second processing module is configured to: in response to the case that no face image is extracted from the acquired image, determine that the driver is off duty.

The embodiments of the present disclosure further provide an electronic device, including a processor and a memory configured to store a computer program runnable on the processor.

The processor is configured to execute, when the computer program is run, any foregoing method for detecting an on-duty state of a driver.

The embodiments of the present disclosure further provide a computer storage medium having a computer program stored thereon. When the computer program is executed by a processor, any foregoing method for detecting an on-duty state of a driver is implemented.

The embodiments of the present disclosure further provide a computer program product, which includes computer executable instructions, where when the computer executable instructions are executed, any method for detecting an on-duty state of a driver according to any one of the embodiments of the present disclosure can be implemented.

It should be understood that the foregoing general descriptions and the following detailed descriptions are merely exemplary and explanatory, but are not intended to limit the present disclosure.

BRIEF DESCRIPTION OF DRAWINGS

The accompanying drawings herein are incorporated into the specification and constitute a part of the specification. These accompanying drawings show embodiments that conform to the present disclosure, and are intended to describe the technical solutions in the present disclosure together with the specification.

DETAILED DESCRIPTION

In the method and apparatus for detecting am on-duty state of a driver, the electronic device, and the computer storage medium provided by the embodiments of the present disclosure, it is determined that the vehicle-mounted image acquisition device is not blocked; the face image is extracted from the image acquired by the vehicle-mounted image acquisition device when the vehicle is in the starting state; the vehicle-mounted image acquisition device is mounted on the vehicle and is at least configured to acquire the image of the driving position region of the vehicle; and in response to the case that no face image is extracted from the acquired image, it is determined that the driver is off duty. In this way, in the embodiments of the present disclosure, after determining that the vehicle-mounted image acquisition device is not blocked, the on-duty state of the driver can be determined by determining whether the image acquired by the vehicle-mounted image acquisition device includes a face image; and therefore, the influence on the on-duty state detection of the driver caused by the blocking of the vehicle-mounted image acquisition device can be reduced, and the accuracy and reliability of the on-duty state detection of the driver can be improved.

The present disclosure is further described in detail below with reference to the accompanying drawings and the embodiments. It should be understood that the embodiments provided herein are merely used for explaining the present disclosure, rather than defining the present disclosure. In addition, the embodiments provided below are some embodiments for implementing the present disclosure, but not all the embodiments for implementing the present disclosure. The technical solutions recited in the embodiments of the present disclosure can be implemented at any combination form without causing conflicts.

It should be noted that in the embodiments of the present disclosure, the terms "include", "comprise", or any other variant thereof aim at covering non-exclusive "comprising", so that the method or apparatus including a series of elements not only includes the elements that are explicitly recited, but also includes other elements that are not explicitly listed, or also includes the elements inherent to the implementation of the method or the apparatus. In the case that there is no more limitations, the elements defined by a phrase "including one . . . " does not exclude that there are other related elements in the method or apparatus which include the elements (for example, the operations in the method or the units in the apparatus; for example, the units can be some circuits, some processors, some programs or software, etc.).

The term "and/or" herein only describes an association relation between associated objects, indicating that three relations may exist, for example, A and/or B may indicate three conditions, i.e., A exists separately, A and B exist simultaneously, and B exists separately. In addition, the term "at least one" herein indicates any one of multiple elements or any combination of at least two of multiple elements. For example, including at least one of A, B, or C may indicate including any one or more elements selected from a set consisting of A, B, and C.

For example, the method for detecting an on-duty state of a driver provided by the embodiments of the present disclosure includes a series of operations, but is not limited to the recited operations. Similarly, the apparatus for detecting an on-duty state of a driver provided by the embodiments of the present disclosure includes a series of modules, but is not limited to the explicitly recited modules, and may further include modules needing to be configured for obtaining related information or performing processing based on information.

The embodiments of the present disclosure may be applied to a terminal, which may operate with numerous other general-purpose or special-purpose computing system environments or configurations. Herein, the terminal may be a vehicle-mounted terminal, a thin client, a thick client, handheld or laptop device, a microprocessor-based system, a set top box, a programmable consumer electronic, a network personal computer, a small computer system, and the like.

The electronic devices such as the terminals may be described in the general context of computer system executable instructions (for example, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

Based on the contents of the foregoing descriptions, a method and apparatus for detecting an on-duty state of a driver are provided in some embodiments of the present disclosure, and may be implemented in scenarios, such as a driver monitoring system and an intelligent vehicle cabin.

Figure 1:
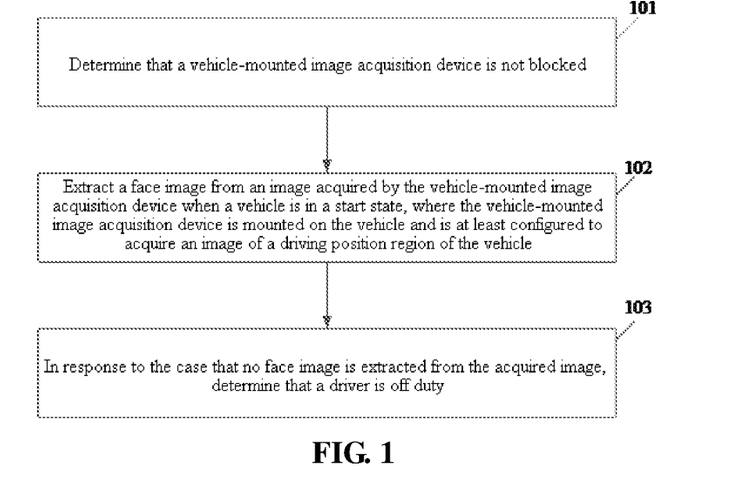
FIG. 1 is a flowchart of a method for detecting an on-duty state of a driver according to embodiments of the present disclosure.

FIG. 1 is a flowchart of a method for detecting an on-duty state of a driver according to embodiments of the present disclosure. As shown in FIG. 1, the flow may include the following operations.

At operation 101, it is determined that a vehicle-mounted image acquisition device is not blocked. The blocking of the vehicle-mounted image acquisition device means that more than 75% of the visual field of the vehicle-mounted image acquisition device is blocked with opaque materials.

Herein, the vehicle-mounted image acquisition device may be a camera. Optionally, the vehicle-mounted image acquisition device may be an infrared camera, and thus may acquire image data in the vehicle at night or in other dark cases.

In practical applications, whether the vehicle-mounted image acquisition device is in a blocked state may be determined according to the image acquired by the vehicle-mounted image acquisition device when the vehicle is in a starting state Exemplarily, whether the vehicle-mounted image acquisition device is blocked may be determined according to the feature information of the image acquired by the vehicle-mounted image acquisition device.

As one implementation, the feature information of the acquired image may include at least one of the following: average brightness, a ratio of a foreground area to an effective area, and the number of contours in the image. Herein, the average brightness of the image represents the average brightness of the entire image; the foreground area of the image represents the area of a foreground portion of the image recognized from the acquired image; the effective area of the image is preset and is less than or equal to the area of the acquired image; or the number of contours in the image is the number of target contours obtained by performing target recognition on the acquired image.

In practical applications, the foreground portion and a background portion of the mage may be separated by using multiple methods. Exemplarily, the foreground portion and the background portion of the image may be separated by using a dynamic threshold segmentation method. Specifically, for a process of separating the foreground portion and the background portion of the image by using the dynamic threshold segmentation method, different gray thresholds can be set for different regions of the image; and for pixel points in the image, by comparing the gray values of the pixel points with a corresponding gray threshold, it can be determined that the pixel points are foreground points or background points, and thus, the foreground portion and the background portion of the image can be determined.

In practical applications, target detection and recognition may be performed on the image by using a contour detection method to obtain target contours, and thus, the number of the target contours can be determined. For example, after performing contour detection on the image, five target contours such as a vehicle seat and a human body can be obtained, and thus the number of contours in the image is 5. The embodiments of the present disclosure do not define the contour detection method.

Optionally, the effective area of the acquired image may be preset according to relative positions of the vehicle-mounted image acquisition device and a light supplementing lamp, and the light supplementing lamp is configured to supplement light for a region where the vehicle-mounted image acquisition device performs image acquisition. If the image acquisition device is an infrared camera, the light supplementing lamp is an infrared light supplementing lamp. In a specific example, when the light supplementing lamps are uniformly distributed around a lens of the image acquisition device, i.e., when supplemental light is uniformly distributed on the entire acquired image, the effective area of the image may be the area of the entire acquired image; and when the supplemental light is mainly distributed at the center of the acquired image, the effective area may be determined as the area of a circle taking a short side of an acquired image frame as the diameter.

In practical applications, after acquiring the image, the vehicle-mounted image acquisition device may transmit the acquired image to a device such as a processor for further processing. The vehicle-mounted image acquisition device may acquire images in real time to obtain multiple continuously acquired images. For example, the vehicle-mounted image acquisition device may acquire images every N seconds, and N may be preset.

At operation 102, a face image is extracted from an image acquired by the vehicle-mounted image acquisition device when the vehicle is in the starting state, where the vehicle-mounted image acquisition device is mounted on the vehicle and is at least configured to acquire an image of a driving position region of the vehicle.

The starting state of the vehicle means a state when the vehicle is ignited and after the ignition and before a vehicle engine is turned off.

In practical applications, the vehicle-mounted image acquisition device may be mounted toward the driving position region, so that when there is a person in the driving position, the image of the person in the driving position can be captured. Exemplarily, the starting state of the vehicle includes that the traveling speed of the vehicle is greater than a set speed, and the set speed can be set according to actual requirements. For example, the set speed may be 1 km/h or any other speed value. In practical applications, the face image may be extracted from the acquired image by using a face recognition technique. The embodiments of the present disclosure do not limit the type of the face recognition technique, for example, a face recognition technique based on depth learning can be utilized.

At operation 103, in response to the case that no face image is extracted from the acquired image, it is determined that the driver is off duty.

In the embodiments of the present disclosure, the driver being off duty means a state that a preset driver is not in the driving position or there is no person in the driving position. When no face image is extracted from the acquired image, it can be directly determined that there is no person in the driving position, and thus, it can be determined that the driver is off duty.

In practical application, operations 101 to 103 may be implemented based on a processor, etc. in the apparatus for detecting an off-duty of a driver. The processor may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor. It can be understood that: for different apparatuses for detecting an off-duty of a driver, an electronic device configured to implement the functions of the foregoing processor may also be others, and not specific limitation is made in the embodiments of the present disclosure.

In the process of actually using a driver monitoring system, due to reasons such as the dislike of being monitored, some drivers block a monitoring camera by using some objects such as clothes, a paper cup, and an adhesive tape, resulting in the failure of the monitoring system and the inability to accurately determine the on-duty state of the driver.

Moreover, in the embodiments of the present disclosure, after determining that the vehicle-mounted image acquisition device is not blocked, the on-duty state of the driver may be determined by determining whether the image acquired by the vehicle-mounted image acquisition device includes a face image; and therefore, the influence on the on-duty state detection of the driver caused by the blocking of the vehicle-mounted image acquisition device can be reduced, and the accuracy and reliability of the on-duty state detection of the driver can be improved. Furthermore, if a face image is extracted from the acquired image, whether the features of the face image extracted from the image match the features of a pre-stored face image of the driver may be determined; and in response to the case that the features of the face image extracted from the acquired image do not match the features of the pre-stored face image of the driver, it can be determined that the driver is off duty.

Optionally, in response to the case that the features of the face image extracted from the acquired image match the features of the pre-stored face image of the driver, it can be determined that the driver is on duty.

In practical applications, the face image of the driver may be pre-stored by means of driver registration.

Optionally, the face image of the driver may be pre-stored by using the following operations: after authentication succeeds on a mobile terminal, uploading the face image of the driver to a cloud server by means of the mobile terminal and saving the face image in the cloud server; and after the face image of the driver saved in the cloud server and related to the vehicle is updated, sending, by the cloud server, the updated face image of the driver related to the vehicle to the vehicle after the vehicle establishes a connection with the cloud server. Specifically, driver registration may be performed in the cloud server by means of an application (APP) installed on the mobile terminal, and when performing driver registration by means of the mobile terminal, the face image of the driver is uploaded to the cloud server by means of the mobile terminal. Herein, the driver registration may be performed in the cloud server when the vehicle is not started; and the driver registration may also be performed in the cloud server when the vehicle is started but does not travel.

Optionally, the face image of the driver is pre-stored by means of the following operations: in the case that the vehicle is started but does not travel, after the authentication succeeds, acquiring the face image of the driver by means of the vehicle-mounted image acquisition device and saving same.

In the embodiments of the present disclosure, accurate detection of whether the driver is off duty or on duty may be implemented by determining whether the face image in the acquired image matches the pre-stored face image of the driver. The matching detection of the face image avoids the unsafety of the vehicle or unsafe driving caused by only detecting whether there is a person in the driving position when an unrelated person or a person having no driving qualification is in the driving position. It can be seen that, in the embodiments of the present disclosure, the face image of the driver who should be on duty may be obtained in advance, and then the on-duty state of the driver who should be on duty is determined by determining whether the currently extracted face image matches the pre-stored face image of the driver who should be on duty, thereby further improving driving safety.

In the embodiments of the present disclosure, the face image in the acquired image may include one face image, and may also include a plurality of face images; when there are a plurality of face images in the acquired image, for each face image in the acquired image, an image region where each face image is located may be determined; for example, one face image in the acquired image may be located in the driving position region of the acquired image, and may also be located in a non-driving position region of the acquired image; and the driving position region of the image may be preset, for example, the driving position region of the image may be the left half portion of the image.

As one implementation, when the face images extracted from the acquired image include a plurality of face images, a face image in the driving position region in the acquired image may be selected from the plurality of face images; and in response to the case that the features of the selected face image do not match the features of the pre-stored face image of the driver, it is determined that the driver is off duty.

Optionally, in response to the case that the features of the selected face image match the features of the pre-stored face image of the driver, it is determined that the driver is on duty.

It can be seen that, in the embodiments of the present disclosure, for the selected face image of the driving position region in the image, subsequent feature matching determination of the face image may be performed, so that whether the person currently appearing in the driving position region is the driver who should be on duty may be determined, thereby further improving the accuracy of the on-duty state detection of the driver.

As one implementation, a duration during which the driver is continuously off duty may be determined by determining in real time whether the features of the face image in the acquired image match those of the pre-stored face image of the driver.

That is, in a plurality continuously acquired image frames, for each acquired image frame, whether the features of the face image match those of the pre-stored face image of the driver may be determined; when a plurality of continuous determination results are mismatching, the duration during which the driver is continuously off duty may be determined according to the acquisition duration of the plurality of image frames; for example, for the plurality of image frames that are acquired within 1 minute, if the determination results all are mismatching, then it can be determined that the duration during which the driver is continuously off duty at least is 1 minute.

Furthermore, whether the duration during which the driver is continuously off duty exceeds a first set duration is determined; when the duration during which the driver is continuously off duty exceeds the first set duration (i.e., greater than or equal to the first set duration), first warning information is sent; and when the duration during which the driver is continuously off duty does not exceed the first set duration, the duration during which the driver is continuously off duty may be continued to be calculated.

Herein, the first set duration may be preset according to an actual application scenario; for example, the first set duration may be 2 seconds. The form of the first warning information includes, but is not limited to: sound warning information, light-emitting warning information, vibration warning information and the like.

Furthermore, after the first warning information is sent, if it is determined that the driver is on duty, the sending of the first warning information is stopped. In this way, processing can be flexibly performed on the first warning information according to the change of the on-duty state of the driver, so as to better satisfy the actual requirements.

Furthermore, after the first warning information is sent, the first warning information may be locally saved to facilitate subsequent query; and after the first warning information is sent, the first warning information may also be uploaded to the cloud to facilitate notifying a remote monitoring person.

Optionally, the image acquired by the vehicle-mounted image acquisition device when the driver is in an off-duty state may also be locally saved or uploaded to the cloud to facilitate subsequent analysis.

For the implementation of determining whether the vehicle-mounted image acquisition device is in the blocked state according to the image acquired by the vehicle-mounted image acquisition device when the vehicle is in the starting state, exemplarily, the average brightness of the acquired image may be determined according to the acquired image; if a duration during which the average brightness of the acquired image is less than a first brightness threshold is greater than or equal to a second set duration, or if a duration during which the average brightness of the acquired image is greater than a second brightness threshold is greater than or equal to the second set duration, it can be determined that the vehicle-mounted image acquisition device is in the blocked state; herein, the first brightness threshold is less than the second brightness threshold.

Optionally, if it is determined that the average brightness of the acquired image is greater than or equal to the first brightness threshold, and is less than or equal to the second brightness threshold, the ratio of the foreground area to the effective area of the acquired image may be determined; and if a duration during which the ratio of the foreground area to the effective area of the acquired image is greater than a set value is greater than or equal to a third set duration, it can be determined that the vehicle-mounted image acquisition device is in the blocked state.

In a specific example, when a blocked area (the foreground area) is defined to be greater than 75% of the effective area of the entire image, it is considered that the vehicle-mounted image acquisition device (such as an infrared camera) is blocked.

Optionally, if it is determined that the average brightness of the acquired image is greater than or equal to the first brightness threshold, and is less than or equal to the second brightness threshold, and it is determined that the ratio of the foreground area to the effective area of the acquired image is less than or equal to the set value, the number of contours in the acquired image may be determined; if a duration during which the number of contours in the acquired image is less than a set number is greater than or equal to a fourth set duration, it can be determined that the vehicle-mounted image acquisition device is in the blocked state; and if the number of contours in the acquired image is greater than or equal to the set number, it can be determined that the vehicle-mounted image acquisition image is in an unblocked state.

In the embodiments of the present disclosure, the first brightness threshold, the second brightness threshold, the set value, and the set number all may be preset according to actual application scenarios, for example, the value range of the set value may be from 65% to 85%, and the value range of the set number may be from 8 to 12. The second set duration, the third set duration, and the fourth set duration all may be preset according to actual application scenarios; the second set duration, the third set duration, and the fourth set duration may be identical or different pairwise. In one example, the value ranges of the second set duration, the third set duration, and the fourth set duration all may be from 4 to 7 seconds.

Furthermore, from the moment when it is determined that the vehicle-mounted image acquisition device is not blocked, timing is started to obtain a duration during which the vehicle-mounted image acquisition device is blocked; whether the duration during which the vehicle-mounted image acquisition device is blocked exceeds a fifth set duration (i.e., greater than or equal to the fifth set duration) is determined; if the duration during which the vehicle-mounted image acquisition device is blocked exceeds the fifth set duration, second warning information may be sent; and if the duration during which the vehicle-mounted image acquisition device is blocked does not exceed the fifth set duration, the timing is continued so as to continue to obtain the duration during which the vehicle-mounted image acquisition device is blocked.

Herein, the fifth set duration may be preset according to an actual application scenario; and the fifth set duration may be the same as or different from the first set duration. For example, the fifth set duration may be 5 seconds. The form of the second warning information includes, but is not limited to: sound warning information, light-emitting warning information, vibration warning information and the like.

Furthermore, after the second warning information is sent, if it is determined that the vehicle-mounted image acquisition device is in the unblocked state, the sending of the second warning information is stopped. In this way, whether to send the second warning information can be flexible decided according to whether the vehicle-mounted image acquisition device is blocked, which is more in line with actual requirements.

Furthermore, after the second warning information is sent, the second warning information may be locally saved to facilitate subsequent query; and after the second warning information is sent, the second warning information may also be uploaded to the cloud to facilitate notifying the remote monitoring person.

In practical applications, if the image acquisition device is an infrared camera, it is required to consider the characteristics of the infrared camera; if the driver blocks all infrared light supplementing lamps by means of an adhesive tape and the like, the foreground area is not necessarily greater than 75%, and in this case, it is required to determine, by means of the average brightness of the image, whether the infrared camera is blocked. For example, whether the average brightness of the image is less than the first brightness threshold is determined; if the average brightness of the image is less than the first brightness threshold or greater than the second brightness threshold, timing is started; if the duration reaches 5 seconds, it is considered that the infrared camera is blocked; if the average brightness of the image is greater than or equal to the first brightness threshold and is less than or equal to the second brightness threshold, the segmentation of the foreground portion and the background portion of the image is started according to the dynamic threshold segmentation method; if the foreground area is greater than 75% of the effective area, timing is started; if the duration reaches 5 seconds, it is considered that the infrared camera is blocked; if the foreground area is not greater than 75% of the effective area, the number of contours in the image is obtained by means of contour detection; if the number of contours is less than 10 and the duration reaches 5 seconds, it is considered that the infrared camera is blocked; and if the number of contours is not less than 10, it may be considered that the infrared camera is not blocked.

As one implementation, if it is detected that the infrared camera is blocked and the duration exceeds the fifth set duration, the second warning information is sent; for example, the second warning information may be a speech warning, i.e., "please do not block the camera". If it is detected that the driver is off duty and the duration during which the driver is continuously off duty exceeds the first set duration, the first warning information is sent; for example, the first warning information may be a speech warning, i.e., "please return to the driving position".

A person skilled in the art can understand that, in the foregoing methods of the specific implementations, the writing order of the operations does not imply a strict execution order which constitutes any limitation to the implementation process, and the specific execution order of the operations should be determined by functions and possible internal logics thereof.

On the basis of the method for detecting an on-duty state of a driver provided by the foregoing embodiments, the embodiments of the present disclosure provide an apparatus for detecting an on-duty state of a driver.

Figure 2:
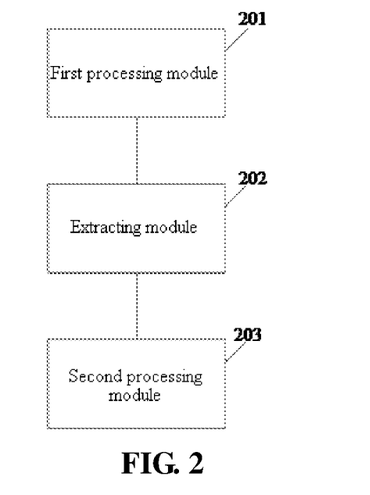
FIG. 2 is a schematic diagram of a component structure of an apparatus for detecting an on-duty state of a driver according to embodiments of the present disclosure.

FIG. 2 is a schematic diagram of a component structure of an apparatus for detecting an on-duty state of a driver according to embodiments of the present disclosure. As shown in FIG. 2, the apparatus includes a first processing module 201, an extracting module 202, and a second processing module 203, where the first processing module 201 is configured to determine that a vehicle-mounted image acquisition device is not blocked;

the extracting module 202 is configured to extract a face image from an image acquired by the vehicle-mounted image acquisition device when a vehicle is in a starting state, where the vehicle-mounted image acquisition device is mounted on the vehicle and is at least configured to acquire an image of the driving position region of the vehicle; and the second processing module 203 is configured to: in response to the case that no face image is extracted from the acquired image, determine that a driver is off duty.

In one implementation, the second processing module 203 is further configured to: in response to the case that a face image is extracted from the acquired image, determine whether the features of the face image extracted from the image match the features of a pre-stored face image of the driver; and in response to the case that the features of the face image extracted from the acquired image do not match the features of the pre-stored face image of the driver, determine that the driver is off duty.

In one implementation, the second processing module 203 is configured to: in response to the case that the features of the face image extracted from the acquired image do not match the features of the pre-stored face image of the driver, determine that the driver is off duty, including:

in response to the case that the face images extracted from the acquired image include a plurality of face images, selecting, from the plurality of face images, a face image in the driving position region in the acquired image; and in response to the case that the features of the selected face image do not match the features of the pre-stored face image of the driver, determining that the driver is off duty.

In one implementation, the second processing module 203 is further configured to: in response to the case that the features of the face image extracted from the acquired image match the features of the pre-stored face image of the driver, determine that the driver is on duty.

In one implementation, the second processing module 203 is configured to: in response to the case that the features of the face image extracted from the acquired image match the features of the pre-stored face image of the driver, determine that the driver is on duty, including: in response to the case that the face images extracted from the acquired image include a plurality of face images, selecting, from the plurality of face images, a face image in the driving position region in the acquired image; and in response to the case that the features of the selected face image match the features of the pre-stored face image of the driver, determining that the driver is on duty.

In one implementation, the second processing module 203 is further configured to send, in response to the case that a duration during which the driver is continuously off duty exceeds a first set duration, first warning information.

In one implementation, the second processing module 203 is further configured to stop sending the first warning information after sending the first warning information and after determining that the driver is on duty.

In one implementation, the second processing module 203 is further configured to locally save the image acquired by the vehicle-mounted image acquisition device when the driver is in an off-duty state, or upload same to the cloud.

In one implementation, the first processing module 201 is further configured to pre-store the face image of the driver by using the following operations: after authentication succeeds on a mobile terminal, uploading the face image of the driver to a cloud server by means of the mobile terminal and saving the face image in the cloud server; and after the face image of the driver saved in the cloud server and related to the vehicle is updated, sending, by the cloud server, the updated face image of the driver related to the vehicle to the vehicle after the vehicle establishes a connection with the cloud server.

In one implementation, the first processing module 201 is further configured to pre-store the face image of the driver by using the following operations:

in the case that the vehicle is in the starting state but does not travel, after the authentication succeeds, acquiring the face image of the driver by means of the vehicle-mounted image acquisition device and saving same.

In one implementation, the first processing module 201 is configured to determine that the vehicle-mounted image acquisition device is not blocked, including: determining, according to the image acquired by the vehicle-mounted image acquisition device when the vehicle is in the starting state, whether the vehicle-mounted image acquisition device is in a blocked state.

In one implementation, the first processing module 201 is configured to determine, according to the image acquired by the vehicle-mounted image acquisition device when the vehicle is in the starting state, whether the vehicle-mounted image acquisition device is in the blocked state, including: determining the average brightness of the image according to the acquired image; and in response to a duration during which the average brightness of the image is less than a first brightness threshold being greater than or equal to a second set duration, or a duration during which the average brightness of the image is greater than a second brightness threshold being greater than or equal to the second set duration, determining that the vehicle-mounted image acquisition device is in the blocked state, where the first brightness threshold is less than the second brightness threshold.

In one implementation, the first processing module 201 is configured to determine, according to the image acquired by the vehicle-mounted image acquisition device when the vehicle is in the starting state, whether the vehicle-mounted image acquisition device is in the blocked state, further including:

determining that the average brightness of the acquired image is greater than or equal to a first brightness threshold, and is less than or equal to a second brightness threshold, where the first brightness threshold is less than the second brightness threshold; and in response to a duration during which the ratio of a foreground area to an effective area of the acquired image is greater than a set value being greater than or equal to a third set duration, determining that the vehicle-mounted image acquisition device is in the blocked state, where the foreground area represents the area of a foreground portion of the image recognized from the acquired image, and the effective area is preset and is less than or equal to the area of the acquired image.

In one implementation, the first processing module 201 is configured to determine, according to the image acquired by the vehicle-mounted image acquisition device when the vehicle is in the starting state, whether the vehicle-mounted image acquisition device is in the blocked state, further including:

determining that the average brightness of the acquired image is greater than or equal to a first brightness threshold, and is less than or equal to a second brightness threshold, where the first brightness threshold is less than the second brightness threshold;

determining that the ratio of a foreground area to an effective area of the acquired image is less than or equal to a set value, where the foreground area represents the area of a foreground portion of the image recognized from the acquired image, and the effective area is preset and is less than or equal to the area of the acquired image; and in response to a duration during which the number of contours in the acquired image is less than a set number being greater than or equal to a fourth set duration, determining that the vehicle-mounted image acquisition device is in the blocked state, where the number of contours is the number of target contours obtained by performing contour detection on the acquired image.

In one implementation, the first processing module 201 is configured to determine, according to the image acquired by the vehicle-mounted image acquisition device when the vehicle is in the starting state, whether the vehicle-mounted image acquisition device is in the blocked state, further including:

determining that the average brightness of the acquired image is greater than or equal to a first brightness threshold, and is less than or equal to a second brightness threshold, where the first brightness threshold is less than the second brightness threshold;

determining that the ratio of a foreground area to an effective area of the acquired image is less than or equal to a set value, where the foreground area represents the area of a foreground portion of the image recognized from the acquired image, and the effective area is preset and is less than or equal to the area of the acquired image; and in response to the number of contours in the acquired image being greater than or equal to a set number, determining that the vehicle-mounted image acquisition device is in an unblocked state, where the number of contours is the number of target contours obtained by performing contour detection on the acquired image.

In one implementation, the effective area of the acquired image is preset according to relative positions of the vehicle-mounted image acquisition device and a light supplementing lamp, and the light supplementing lamp is configured to supplement light for a region where the vehicle-mounted image acquisition device performs image acquisition.

In one implementation, the vehicle-mounted image acquisition device is an infrared camera.

In one implementation, the first processing module 203 is further configured to send, in the case that the vehicle-mounted image acquisition device is determined to be in the blocked state, second warning information in response a duration during which the vehicle-mounted image acquisition device is continuously in the blocked state being greater than a fifth set duration.

In one implementation, the first processing module 203 is further configured to stop sending the second warning information after sending the second warning information and after determining that the vehicle-mounted image acquisition device is in the unblocked state.

In one implementation, the starting state of the vehicle includes that the traveling speed of the vehicle is greater than the set speed.

In practical applications, the first processing module 201, the extracting module 202, and the second processing module 203 may be all implemented by a processor located in an electronic device, and the processor may be at least one of an ASIC, a DSP, a DSPD, a PLD, an FPGA, a CPU, a controller, a microcontroller, or a microprocessor.

In addition, functional units in the embodiments may be integrated into one processing unit, or each of the units may exist alone physically, or two or more units may be integrated into one unit. The integrated unit may be implemented in the form of hardware, or may also be implemented in the form of a software functional unit.

When the integrated unit is implemented in the form of the software functional unit and sold or used as an independent product, the integrated unit may be stored in one computer readable storage medium. Based on such an understanding, the technical solutions of the present disclosure essentially, or some of the technical solutions contributing to the prior art, or all or some of the technical solutions may be embodied in the form of a software product. The computer software product is stored in one storage medium and includes several instructions so that one computer device (which may be a personal computer, a server, a network device, and the like) or a processor implements all or some of the operations of the method in the embodiments. Moreover, the preceding storage medium includes: various media capable of storing program codes, such as a USB flash drive, a mobile hard disk drive, a Read-only Memory (ROM), a Random Access Memory (RAM), a floppy disk, and an optical disc.

Specifically, the computer program instruction corresponding to the method for detecting an on-duty state of a driver in the embodiments may be stored in the storage medium, such as an optical disk, a hard disk drive, and a USB flash drive. When the computer program instruction corresponding to the method for detecting an on-duty state of a driver in the storage medium is read or implemented by one electronic device, any one method for detecting an on-duty state of a driver of the foregoing embodiments is implemented.

Figure 3:
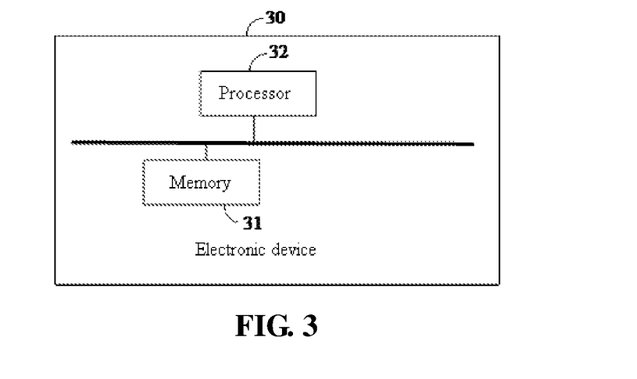
FIG. 3 is a schematic structural diagram of an electronic device according to embodiments of the present disclosure.

Based on the same technical concept of the foregoing embodiments, with reference to FIG. 3 which shows an electronic device 30 provided by the embodiments of the present disclosure, the electronic device may include a memory 31 and a processor 32, where the memory 31 is configured to store a computer program and data, and the processor 32 is configured to execute the computer program stored in the memory to implement the method for detecting an on-duty state of a driver of the foregoing embodiments.

In practical applications, the foregoing memory 31 may be a volatile memory such as an RAM, or a non-volatile memory such as an ROM, a flash memory, a Hard Disk Drive (HDD) or a Solid-State Drive (SSD), or a combination of the foregoing various memories, and provides instructions and data for the processor 32. The foregoing processor 32 may be at least one of an ASIC, a DSP, a DSPD, a PLD, a FPGA, a CPU, a controller, a microcontroller, or a microprocessor. It can be understood that for different devices, the electronic device configured to implement the functions of the foregoing processor may also be other device, and no specific limitation is made in the embodiments of the present disclosure.

The embodiments of the present disclosure further provide a computer storage medium having a computer program stored thereon. When the computer program is executed by a processor, the any method for detecting an on-duty state of a driver recited in the embodiments of the present disclosure is implemented.

The embodiments of the present disclosure further provide a computer program product, which includes computer executable instructions, where when the computer executable instructions are executed, the method for detecting an on-duty state of a driver according to any one of the embodiments of the present disclosure can be implemented.

In some embodiments, functions possessed by or modules included in the apparatus provided in the embodiments of the present disclosure may be configured to implement the method described in the foregoing method embodiments. For specific implementations thereof, reference may be made to descriptions of the foregoing method embodiments. For brevity, details are not described herein again. The descriptions of the embodiments in the present application trend to emphasize differences between the embodiments, and for the same or similar parts in the embodiments, reference may be made to each other. For brevity, details are not described herein again. The methods disclosed in the method embodiments provided by the present application can be arbitrarily combined without causing conflicts so as to obtain a new method embodiment. The features disclosed in the product embodiments provided by the present application can be arbitrarily combined without causing conflicts so as to obtain a new product embodiment. The features disclosed in the method or device embodiments provided by the present application can be arbitrarily combined without causing conflicts so as to obtain a new method or device embodiment.

By means of the description of the foregoing implementations, a person skilled in the art can clearly know that the method of the foregoing embodiments can be implemented by software and a necessary general-purpose hardware platform, and also can be implemented by the hardware, but in many cases, the former is a better embodiment. Based on such an understanding, the technical solutions of the present disclosure or some of the technical solutions contributing to the prior art may be essentially embodied in the form of a software product. The computer software product is stored in one storage medium (such as a ROM/RAM, a floppy disk, and an optical disk) and includes several instructions for enabling one terminal (which may be a mobile phone, a computer, a server, an air conditioner, a network device, or the like) implements the method in the embodiments of the present disclosure.

The embodiments of the present disclosure are described above with reference to the accompanying drawings, but the present disclosure is not limited to the foregoing detailed description. The foregoing detailed description is only schematic but not restrictive. Under the motivation of the present disclosure, a person skilled in the art can make many forms without departing from the purpose of the present disclosure and the scopes of protection of the claims, and these all fall within the scope of protection of the present disclosure.

The invention claimed is:

1. A method for detecting an on-duty state of a driver, comprising:
   determining that a vehicle-mounted image acquisition device is not blocked;
   extracting a face image from an image acquired by the vehicle-mounted image acquisition device when a vehicle is in a starting state, wherein the vehicle-mounted image acquisition device is mounted on the vehicle and is at least configured to acquire an image of a driving position region of the vehicle; and
   in response to the case that no face image is extracted from the acquired image, determining that the driver is off duty,
   wherein determining that the vehicle-mounted image acquisition device is not blocked comprises:
      determining, according to feature information of the acquired image, whether the vehicle-mounted image acquisition device is in a blocked state, wherein the feature information of the acquired image comprises an average brightness and at least one of following: a ratio of a foreground area to an effective area or a number of contours in the acquired image,
   wherein determining, according to the feature information of the acquired image, whether the vehicle-mounted image acquisition device is in the blocked state further comprises:
      determining that an average brightness of the acquired image is greater than or equal to a first brightness threshold, and is less than or equal to a second brightness threshold, wherein the first brightness threshold is less than the second brightness threshold; and
      in response to a duration during which the ratio of the foreground area of the acquired image to the effective area of the acquired image is greater than a set value being greater than or equal to a third set duration, determining that the vehicle-mounted image acquisition device is in the blocked state, wherein the foreground area represents an area of a foreground portion of an image recognized from the acquired image, and the effective area is preset and is less than or equal to an area of the acquired image.

2. The method according to claim 1, further comprising:
   in response to the case that the face image is extracted from the acquired image, determining whether features of the face image extracted from the acquired image match features of a pre-stored face image of the driver; and
   in response to the case that the features of the face image extracted from the acquired image do not match the features of the pre-stored face image of the driver, determining that the driver is off duty; or
   in response to the case that the features of the face image extracted from the acquired image match the features of the pre-stored face image of the driver, determining that the driver is on duty.

3. The method according to claim 2, wherein in response to the case that the features of the face image extracted from the acquired image do not match the features of the pre-stored face image of the driver, determining that the driver is off duty comprises:
   in response to the case that the face images extracted from the acquired image comprise a plurality of face images, selecting, from the plurality of face images, a face image in the driving position region in the acquired image; and
   in response to the case that the features of the selected face image do not match the features of the pre-stored face image of the driver, determining that the driver is off duty.

4. The method according to claim 2, wherein in response to the case that the features of the face image extracted from the acquired image match the features of the pre-stored face image of the driver, determining that the driver is on duty comprises:
   in response to the case that the face images extracted from the acquired image comprise a plurality of face images, selecting, from the plurality of face images, a face image in the driving position region in the acquired image; and
   in response to the case that the features of the selected face image match the features of the pre-stored face image of the driver, determining that the driver is on duty.

5. The method according to claim 2, wherein the face image of the driver is pre-stored by using the following operations:
   after authentication succeeds on a mobile terminal, uploading the face image of the driver to a cloud server by the mobile terminal and saving the face image in the cloud server; and
   after the face image of the driver saved in the cloud server and related to the vehicle is updated, sending, by the cloud server, the updated face image of the driver related to the vehicle to the vehicle after the vehicle establishes a connection with the cloud server.

6. The method according to claim 2, wherein the face image of the driver is pre-stored by using the following operations:
   in the case that the vehicle is in the starting state but does not travel, after authentication succeeds, acquiring the face image of the driver by the vehicle-mounted image acquisition device and saving the face image of the driver.

7. The method according to claim 1, further comprising:
   in response to the case that a duration during which the driver is continuously off duty exceeds a first set duration, sending first warning information.

8. The method according to claim 7, wherein after sending the first warning information, the method further comprises:
   after determining that the driver is on duty, stopping sending the first warning information.

9. The method according to claim 1, further comprising:
   locally saving the acquired image when the driver is in an off-duty state, or uploading the acquired image when the driver is in the off-duty state to a cloud.

10. The method according to claim 1, wherein the effective area of the acquired image is preset according to relative positions of the vehicle-mounted image acquisition device and a light supplementing lamp, and the light supplementing lamp is configured to supplement light for a region where the vehicle-mounted image acquisition device performs image acquisition.

11. The method according to claim 1, wherein in the case that the vehicle-mounted image acquisition device is determined to be in the blocked state, the method further comprises:

in response to a duration during which the vehicle-mounted image acquisition device is continuously in the blocked state being greater than a fifth set duration, sending second warning information.

12. The method according to claim 11, wherein after sending the second warning information, the method further comprises:

after determining that the vehicle-mounted image acquisition device is in an unblocked state, stopping sending the second warning information.

13. The method according to claim 1, wherein the starting state of the vehicle comprises that a traveling speed of the vehicle is greater than a set speed.

14. An electronic device, comprising a processor and a memory configured to store a computer program runnable on the processor, wherein when the computer program is run, the processor is configured to:

determine that a vehicle-mounted image acquisition device is not blocked;

extract a face image from an image acquired by the vehicle-mounted image acquisition device when a vehicle is in a starting state, wherein the vehicle-mounted image acquisition device is mounted on the vehicle and is at least configured to acquire an image of a driving position region of the vehicle; and in response to the case that no face image is extracted from the acquired image, determine that a driver is off duty, wherein the processor is specifically configured to determine, according to feature information of the acquired image, whether the vehicle-mounted image acquisition device is in a blocked state, wherein the feature information of the acquired image comprises an average brightness and at least one of following: a ratio of a foreground area to an effective area or a number of contours in acquired image, wherein the processor is specifically configured to:

determine that an average brightness of the acquired image is greater than or equal to a first brightness threshold, and is less than or equal to a second brightness threshold, wherein the first brightness threshold is less than the second brightness threshold; and in response to a duration during which the ratio of the foreground area of the acquired image to the effective area of the acquired image is greater than a set value being greater than or equal to a third set duration, determine that the vehicle-mounted image acquisition device is in the blocked state, wherein the foreground area represents an area of a foreground portion of an image recognized from the acquired image, and the effective area is preset and is less than or equal to an area of the acquired image.

15. A computer storage medium having a computer program stored thereon, wherein when the computer program is executed by a processor, the processor is configured to perform a method comprising:

determining that a vehicle-mounted image acquisition device is not blocked;

extracting a face image from an image acquired by the vehicle-mounted image acquisition device when a vehicle is in a starting state, wherein the vehicle-mounted image acquisition device is mounted on the vehicle and is at least configured to acquire an image of a driving position region of the vehicle; and in response to the case that no face image is extracted from the acquired image, determining that a driver is off duty, wherein determining that the vehicle-mounted image acquisition device is not blocked comprises:

determining, according to feature information of the acquired image, whether the vehicle-mounted image acquisition device is in a blocked state, wherein the feature information of the acquired image comprises an average brightness and at least one of following: a ratio of a foreground area to an effective area or a number of contours in the acquired image, wherein determining, according to the feature information of the acquired image, whether the vehicle-mounted image acquisition device is in the blocked state further comprises:

determining that an average brightness of the acquired image is greater than or equal to a first brightness threshold, and is less than or equal to a second brightness threshold, wherein the first brightness threshold is less than the second brightness threshold; and in response to a duration during which the ratio of the foreground area of the acquired image to the effective area of the acquired image is greater than a set value being greater than or equal to a third set duration, determining that the vehicle-mounted image acquisition device is in the blocked state, wherein the foreground area represents an area of a foreground portion of an image recognized from the acquired image, and the effective area is preset and is less than or equal to an area of the acquired image.

* * * * *